United States Patent
Matsuda (10) Patent No.: US 10,232,669 B2
(45) Date of Patent: Mar. 19, 2019

(54) HEAVY DUTY PNEUMATIC TIRE

(71) Applicant: SUMITOMO RUBBER INDUSTRIES, LTD., Kobe-shi, Hyogo (JP)

(72) Inventor: Kae Matsuda, Kobe-shi (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 617 days.

(21) Appl. No.: 14/933,690

(22) Filed: Nov. 5, 2015

(65) Prior Publication Data
US 2016/0152089 A1    Jun. 2, 2016

(30) Foreign Application Priority Data

Nov. 27, 2014 (JP) ................................. 2014-240397
Dec. 19, 2014 (JP) ................................. 2014-257824

(51) Int. Cl.
*B60C 11/11* (2006.01)
*B60C 11/12* (2006.01)
(Continued)

(52) U.S. Cl.
CPC ...... *B60C 11/0327* (2013.01); *B60C 11/0306* (2013.01); *B60C 11/042* (2013.01);
(Continued)

(58) Field of Classification Search
CPC ..... B60C 11/0306; B60C 11/11; B60C 11/12; B60C 11/125; B60C 11/1369; B60C 2011/1213
See application file for complete search history.

(56) References Cited

U.S. PATENT DOCUMENTS

| | | | | |
|---|---|---|---|---|
| 2004/0238092 | A1* | 12/2004 | Colombo | B29D 30/0606 152/209.15 |
| 2011/0209806 | A1* | 9/2011 | Kishida | B60C 11/11 152/209.23 |
| 2012/0006456 | A1* | 1/2012 | Koshio | B60C 11/11 152/209.18 |
| 2013/0105052 | A1* | 5/2013 | Tanaka | B60C 11/0306 152/209.17 |

(Continued)

FOREIGN PATENT DOCUMENTS

| | | |
|---|---|---|
| EP | 0590916 A1 | 4/1994 |
| EP | 2586626 A1 | 5/2013 |

(Continued)

OTHER PUBLICATIONS

Machine translation for Japan 2005-138713 (Year: 2018).*
(Continued)

*Primary Examiner* — Steven D Maki
(74) *Attorney, Agent, or Firm* — Birch, Stewart, Kolasch & Birch LLP (57) ABSTRACT

A heavy duty pneumatic tire includes a tread portion including a plurality of blocks separated by a plurality of circumferentially extending main grooves and a plurality of lateral grooves. At least one of the blocks is provided with two axially extending sipes to divide the block into a first end portion, a second end portion and a middle portion between the first end portion and the second end portion. The first end portion includes a first projected portion that protrudes outwardly in a block-width direction from the middle portion so as to form a steplike side, and the second end portion includes a second projected portion that protrudes outwardly in an opposite block-width direction to the first projected portion from the middle portion so as to form a steplike side.

11 Claims, 9 Drawing Sheets

(51) Int. Cl.
    *B60C 11/03*     (2006.01)
    *B60C 11/13*     (2006.01)
    *B60C 11/04*     (2006.01)

(52) U.S. Cl.
    CPC ............... *B60C 11/11* (2013.01); *B60C 11/12* (2013.01); *B60C 11/125* (2013.01); *B60C 11/1369* (2013.01); *B60C 2011/1213* (2013.01)

(56) References Cited

U.S. PATENT DOCUMENTS

2014/0345767 A1* 11/2014 Tanaka ................ B60C 11/1263
    152/209.22
2015/0007917 A1* 1/2015 Tanaka ................ B60C 11/0306
    152/209.8

FOREIGN PATENT DOCUMENTS

| | | | |
|---|---|---|---|
| JP | 09-132010 A | * | 5/1997 |
| JP | 11-321234 A | * | 11/1999 |
| JP | 2005-138713 A | * | 6/2005 |
| JP | 2005-280457 A | | 10/2005 |

OTHER PUBLICATIONS

Machine translation for Japan 11-321234 (Year: 2018).*
Machine translation for 09-132010 (Year: 2018).*
Extended European Search Report, dated Apr. 26, 2016, for European Application No. 15194460.0.

* cited by examiner

HEAVY DUTY PNEUMATIC TIRE

BACKGROUND OF THE INVENTION

Field of the Invention

The present invention relates to heavy duty pneumatic tires, and in particular, relates to a heavy duty pneumatic tire that may exhibit an excellent wet performance as well as on-snow performance.

Description of the Related Art

Japanese Unexamined Patent Application Publication No. 2005-280457 discloses a heavy duty pneumatic tire including a tread portion provided with a plurality of tread blocks separated by circumferentially extending main grooves and lateral grooves. Each tread block is provided with two axially extending sipes to divide the block into three portions which includes a pair of end portions and a middle portion therebetween. Each edge of the portions of the block may produce high friction force against icy road by scratching the road. Furthermore, each of the end portions of the block includes a projected portion that protrudes outwardly in a block-width direction from the middle portion. The respective projected portions may increase traction on snowy road by shearing a snow-column compressed in the main groove.

Unfortunately, since the respective projected portions are located on the same side and closely in the circumferential direction of the tire, the space between adjacent projected portions tends to be clogged up with snow during traveling. This may cause a problem of deteriorating of on-snow performance as well as deteriorating of wet performance.

SUMMARY OF THE INVENTION

In view of the above problems in the conventional art, the present invention has an object to provide a heavy duty pneumatic tire that may exhibit an excellent wet performance as well as on-snow performance.

According to one aspect of the invention, a heavy duty pneumatic tire includes a tread portion including a plurality of blocks separated by a plurality of circumferentially extending main grooves and a plurality of lateral grooves. At least one of the blocks is provided with two axially extending sipes to divide the block into a first end portion, a second end portion and a middle portion between the first end portion and the second end portion. The first end portion includes a first projected portion that protrudes outwardly in a block-width direction from the middle portion so as to form a steplike side, and the second end portion includes a second projected portion that protrudes outwardly in an opposite block-width direction to the first projected portion from the middle portion so as to form a steplike side.

In another aspect of the invention, in a plan view of the tread portion, the middle portion may have a pair of side edges each facing each of the main grooves. The pair of side edges may be inclined in the same direction, and each of the first projected portion and the second projected portion may have an edge inclined in the same direction to the side edges.

In another aspect of the invention, the first projected portion may have a first maximum protruding length from an extension line of a corresponding side edge of the middle portion in a range of from 0.10 to 0.25 times a block width, and the second projected portion may have a second maximum protruding length from an extension line of a corresponding side edge of the middle portion in a range of from 0.10 to 0.25 times the block width.

In another aspect of the invention, the blocks may include a first block and a second block, the first block may have the first maximum protruding length being substantially same as the second maximum protruding length, and the second block may have the first maximum protruding length different from the second maximum protruding length.

In another aspect of the invention, the tread portion may further include a first block row including the first block and the second block which are alternately arranged in a circumferential direction of the tire.

In another aspect of the invention, the tread portion may further include a second block row including only a plurality of the first blocks, and the first block row and the second block row are arranged axially adjacently.

In another aspect of the invention, the first end portion may further include a first non-projected portion on an axially opposite side of the first projected portion, and the first non-projected portion may not protrude outwardly from the middle portion in the block-width direction.

In another aspect of the invention, in a plan view of the tread portion, the middle portion may have a pair of side edges each facing each of the main grooves, the pair of side edges may be inclined in the same direction, and the first non-projected portion may be inclined in an opposite direction to the side edges of the middle portion.

In another aspect of the invention, the second end portion may further include a second non-projected portion on an axially opposite side of the second projected portion, and the second non-projected portion may not protrude from the middle portion in the block-width direction.

In another aspect of the invention, in a plan view of the tread portion, the middle portion may have a pair of side edges each facing each of the main grooves, the pair of side edges may be inclined in the same direction, and the second non-projected portion may be inclined in an opposite direction to the side edges of the middle portion.

In another aspect of the invention, the middle portion may have a pair of side edges each facing each of the main grooves, at least one of the lateral grooves arranged adjacent to the first end portion may be provided with a tie-bar in which a bottom is raised, and the tie-bar may extend along the lateral groove so as to cross an extension line of the side edges of the middle portion corresponding to the first projected portion.

In another aspect of the invention, the first end portion may have a straightly extending lateral edge facing one of the lateral grooves, the first projected portion may protrude outwardly in the block-width direction from the extension line, and an axial protruding length of the tie-bar from the extension line may be in a range of from 0.2 to 0.8 times an axial protruding length of the first end portion from the extension line.

DESCRIPTION OF THE EMBODIMENTS

An embodiment of the present invention will be explained below with reference to the accompanying drawings. It should be noted that like elements are denoted by the same reference numerals throughout the disclosure.

Figure 1:
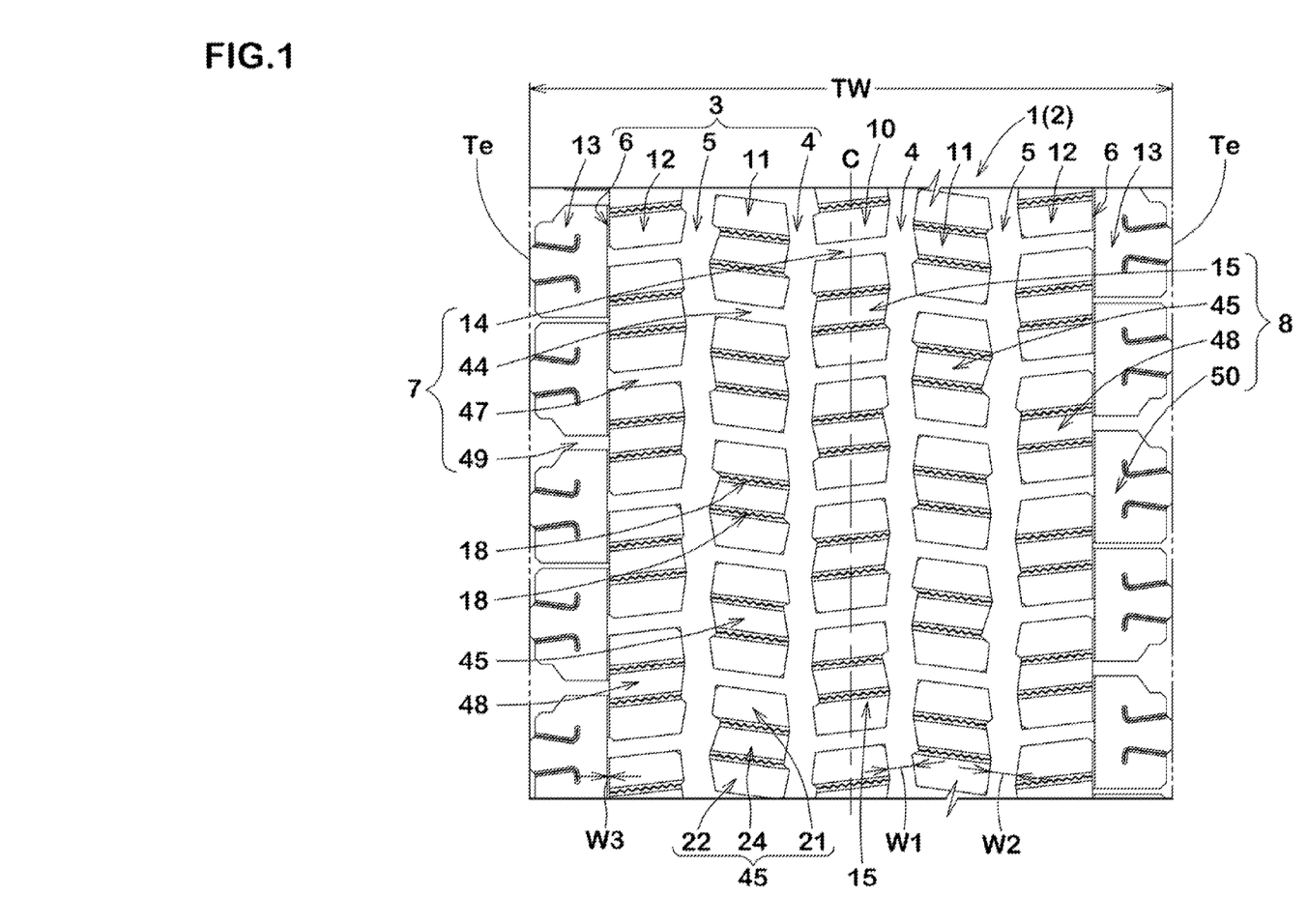
FIG. 1 is a development view of a tread portion of a heavy duty pneumatic tire in accordance with an embodiment of the present invention.

FIG. 1 illustrates a development view of a tread portion 2 of a heavy duty pneumatic tire 1 in accordance with an embodiment of the present invention. The heavy duty pneumatic tire 1, for example, may preferably be embodied as a winter tire. The tread portion 2 of the tire 1 is provided with a plurality circumferentially extending main grooves 3, a plurality of axially extending lateral grooves 7 and a plurality of blocks 8 divided by these grooves.

The main grooves 3 include at least one central main groove 4, at least one shoulder main groove 5 and at least one shoulder narrow groove 6.

At least one central main groove 4 is arranged proximately to the tire equator C, for example. In this embodiment, a pair of the central main grooves 4 and 4 are arranged and extend continuously in the circumferential direction of the tire.

The shoulder main groove 5 is arranged axially outward of the central main groove 3 on each side of the tire equator C. Each of the shoulder main grooves 5 extends continuously in the circumferential direction of the tire.

Preferably, groove widths W1 and W2 of the central main groove 4 and the shoulder main groove 5 respectively may be set in a range of from 0.3% to 8.0% of the tread width TW. Preferably, depths of the central main groove 4 and the shoulder main groove 5 may be set in a range of from 10 to 25 mm.

The tread width TW is defined as the width measured under a normally inflated unloaded condition, as the axial distance between tread edges Te and Te. The normally inflated unloaded condition is such that the tire 1 is mounted on a standard wheel rim with a standard pressure but loaded with no tire load.

In each side of the tire equator C, the tread edge Te refers to an axially outermost edge of the ground contacting patch of the tread portion 2 which occurs under a normally inflated loaded condition when the camber angle of the tire is zero. The normally inflated loaded condition is such that the tire 1 is mounted on the standard wheel rim with the standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this application including specification and claims, various dimensions, positions and the like of the tire refer to those under the normally inflated unloaded condition of the tire unless otherwise noted.

The shoulder narrow groove 6 is arranged proximate to the tread edge Te and extends straightly and continuously in the circumferential direction of the tire on each side of the tire equator C.

The shoulder narrow groove 6 has a width W3 which is smaller than those of the central main groove 4 and the shoulder main groove 5. The width W3 of the shoulder narrow groove 6, for example, may be set in a range of from 0.10 to 0.15 times the width W2 of the shoulder main groove 5. Furthermore, the shoulder narrow groove 6 has a depth smaller than those of the central main groove 4 and the shoulder main groove 5. For example, the depth of the shoulder narrow groove 6 may be set in a range of from 5 to 13 mm.

The tread portion 2 is separated into a central portion 10, a pair of middle portions 11, a pair of inner shoulder portions 12 and a pair of outer shoulder portions 13 by the central main grooves 4, the shoulder main grooves 5 and the shoulder narrow grooves 6.

Figure 2:
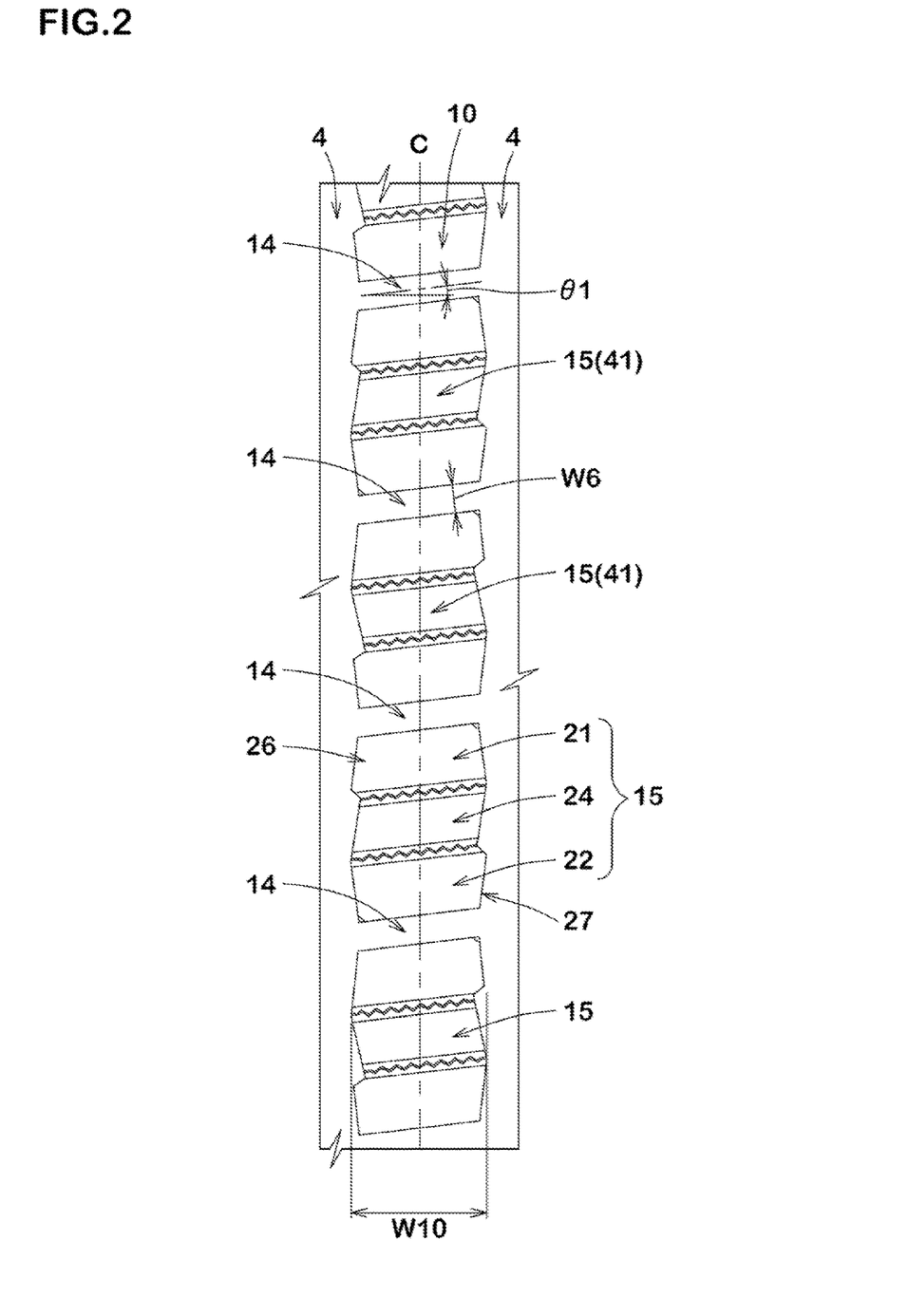
FIG. 2 is an enlarged view of a central portion illustrated in FIG. 1.

FIG. 2 illustrates an enlarged view of the central portion 10. As shown in FIG. 2, the central portion 10 is arranged between the pair of central main groove 4 and 4. The central portion 10 is provided with a plurality of central lateral grooves 14 to form a plurality of central blocks 15.

Each of the central lateral grooves extends so that one of the central main grooves 4 communicates with the other. In this embodiment, each of the central lateral grooves 14 extends in a straight manner, and is inclined in the same direction.

Preferably, the central lateral groove 14 has an angle $\theta 1$ in a range of from 3 to 7 degrees with respect to the axial direction of the tire, and a width W6 in a range of from 5 to 10 mm.

Figure 3:
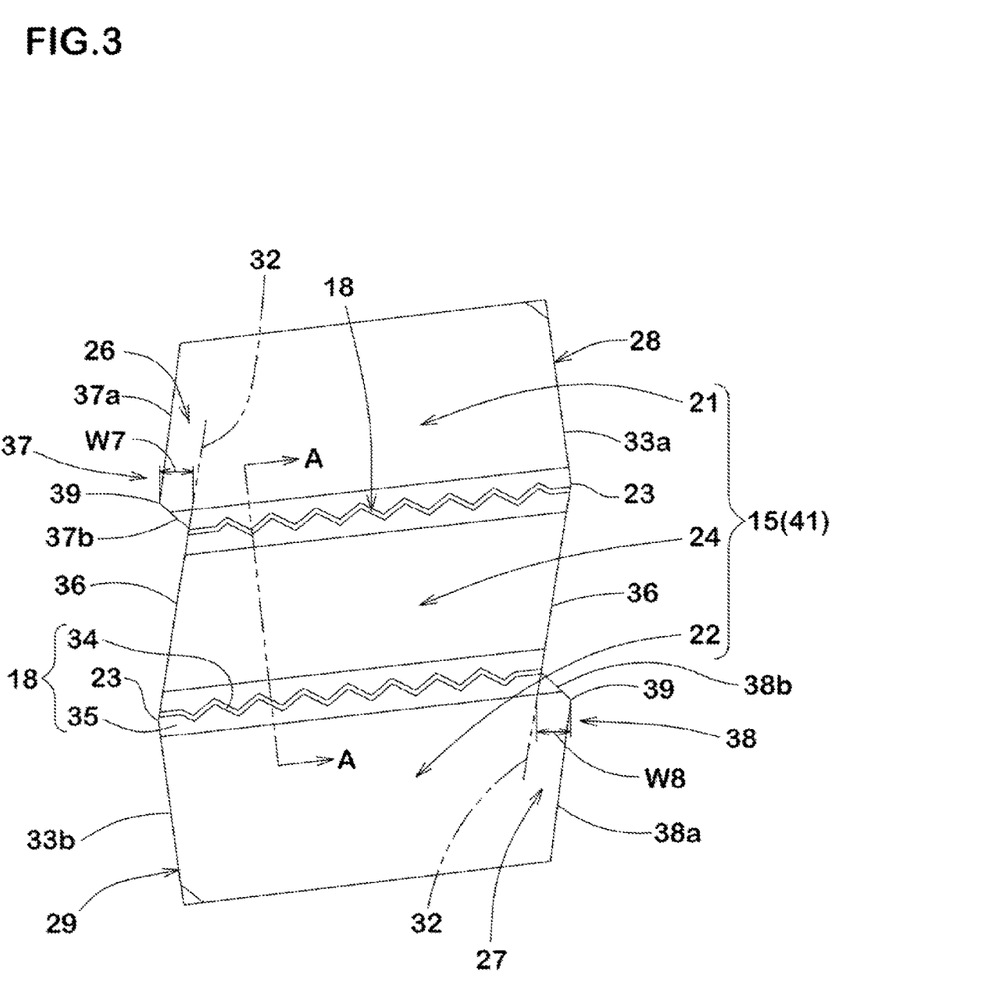
FIG. 3 is an enlarged view of a central block illustrated in FIG. 2.

FIG. 3 illustrates an enlarged view of the central block 15. As shown in FIG. 3, the central block 15 is provided with two axially extending sipes 18 to divide the block 15 into a first end portion 21, a second end portion 22 and a middle portion 24 therebetween.

The sipe 18 extends along the central lateral grooves 14 (shown in FIG. 2). In this embodiment, the respective sipes 18 extend substantially parallel one another. Alternatively, each of the sipes 18 may extend in different angles with respect to the axial direction of the tire.

Figure 4:
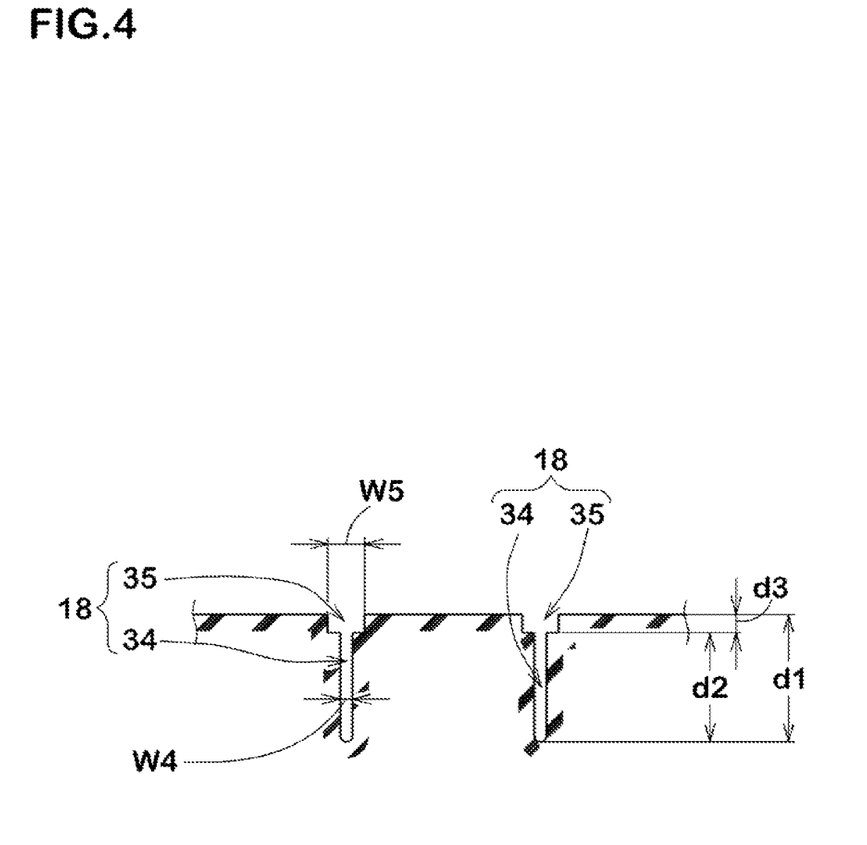
FIG. 4 is a cross-sectional view taken along a line A-A of FIG. 3.

FIG. 4 illustrates a cross-sectional view taken along a line A-A of FIG. 3. As shown in FIGS. 3 and 4, each of the sipes 18 has a depth dl in a range of from 5 to 10 mm, for example. The sipe 18 includes a main portion 34 having a substantially constant width. In this embodiment, an enlarged-width portion 35 is provided on the top portion of the sipe 18.

In a plan view of the tread portion 2, the main portion 34 of the sipe 18 extends in a zigzag manner. The main portion 34 preferably has a width W4 in a range of from 0.3 to 1.0 mm and a depth 2 in a range of from 4.0 to 9.5 mm.

In a plan view of the tread portion 2, the enlarged width portion 35 extends in a straight manner, and more specifically extends in parallel to an amplitude centerline of the enlarged-width portion 35. Preferably, the enlarged-width portion 35 has a width W5 in a range of from 0.5 to 2.0 mm and a depth d3 in a range of from 0.5 to 1.5 mm, for example. In this embodiment, the main portion 34 of the sipe 18 is located on the center of the enlarged-width portion 35 in a width direction. The sipe 18 having the main portion 34 and the enlarged-width portion 35 may exhibit an excellent on-ice performance by sucking up the water on icy road when coming into contact with the road.

As shown in FIG. 3, the central block 15 includes the first end portion 21, the second end portion 22 and the middle portion 24 therebetween. Each portion 21, 22 and 24 is formed as a substantially plain piece that is not provided with any other grooves nor sipes. These portions 21, 22 and 24 may be useful to suppress uneven wear from the block.

The middle portion 24 has a top face substantially quadrilateral. The middle portion 24 includes a pair of side edges 36 and 36 each facing each of the central main grooves 4, and the pair of side edges 36 and 36 are preferably inclined in the same direction. Preferably, the respective side edges 36 and 36 extend in a straight manner and in parallel one another. In this embodiment, the middle portion 24 has the top face formed into a parallelogram, for example.

The first end portion 21 includes a first projected portion 26 that protrudes outwardly in a block-width direction from the middle portion 24 so as to form a steplike side. The second end portion 22 includes a second projected portion 27 that protrudes outwardly in an opposite block-width direction to the first projected portion 26 from the middle portion 24 so as to form a steplike side.

The first projected portion 26 and the second projected portion 27 may provide an excellent on-snow performance by compressing the snow strongly in the corresponding main groove and then shearing it.

Furthermore, since the first projected portion 26 and the second projected portion 27 are disposed in different main grooves, the respective projected portions 26 and 27 are not arranged closely in the same main groove. Thus, the tire 1 in accordance with the present embodiment may improve on-snow performance while ensuring wet performance by preventing a reduction of void of the main groove.

The first projected portion 26 includes an edge 37 that faces the central main groove 4. The edge 37 includes a long edge 37a inclined in the same direction as the side edge 36 of the middle portion 24 and a short edge 37b inclined in an opposite direction to the side edge 36 of the middle portion 24, and which are connected so as to form a sharp corner 39.

Similarly, the second projected portion 27 includes an edge 38 that faces the central main groove 4. The edge 38 includes a long edge 38a inclined in the same direction as the side edge 36 of the middle portion 24 and a short edge 38 inclined in an opposite direction to the side edge 36 of the middle portion 24, and which are connected so as to form a sharp corner 39.

Each of the first projected portion 26 and the second projected portion 27 protrudes outwardly in the block-width direction from the corresponding extension line 32 of the side edge 36 of the middle portion 24.

The first projected portion 26 has a first maximum protruding length W7 in the axial direction from the extension line 2 of the corresponding side edge 36 of the middle portion 24 in a range of not less than 0.10 times, more preferably not less than 0.15 times, but preferably not more than 0.25 times, more preferably not more than 0.20 times the block width W10 shown in FIG. 2) of the central block 15. Similarly, the second projected portion 27 has a second maximum protruding length W8 in the axial direction from the extension line 32 of the corresponding side edge 36 of the middle portion 24 in a range of not less than 0.10 times, more preferably not less than 0.15 times, but preferably not more than 0.25 times, more preferably not more than 0.20 times the block width W10 (shown in FIG. 2) of the central block 15. These configurations may further be useful to improve wet performance and on-snow performance in a well balanced manner.

In this embodiment, the central block 15 includes a first block 41 that has the first maximum protruding length W7 being substantially same as the second maximum protruding length W8. Such a first block 41 may prevent uneven wear from each of the end portions 21 and 22.

The first end portion 21 further includes a first non-projected portion 28 on an axially opposite side of the first projected portion 26. The first non-projected portion 28 is configured not to protrude from the middle portion 24 in the block-width direction. Similarly, the second end portion 22 further includes a second non-projected portion 29 on an axially opposite side of the second projected portion 27. The second non-projected portion 29 is configured not to protrude from the middle portion 24 in the block-width direction.

The first non-projected portion 28 is configured as an edge 33a which faces the central main groove 4 and which is inclined in an opposite direction to the side edge 36 of the middle portion 24. The second non-projected portion 29 is configured as an edge 33b which faces the central main groove 4 and which is inclined in an opposite direction to the side edge 36 of the middle portion 24. The first non-projected portion 28 and the second non-projected portion 29 may provide edge effect in various directions to improve on-ice performance. Furthermore, these non-projected portions 28 and 29 may ensure sufficient void of the central main groove 4 to improve wet performance.

As shown in FIG. 3, the edge 33a of the first end portion 21 is connected to the side edge 36 of the middle portion 24 to form a corner 23 that protrudes toward the central main groove 4. The edge 33b of the second end portion 22 is connected to the side edge 36 to form a corner 23 that protrudes toward the central main groove 4. The respective corners 23 having a V-shaped edge, for example, may be useful to generate large friction against the road such as icy and snowy roads.

Furthermore, when the edge 33a of the first end portion 21 receives a lateral force from the compressed snow in the central main groove 4, the first end portion 21 is elastically deformed so that the first projected portion 26 further protrudes into the central main groove 4. Accordingly, the first projected portion 26 may further compress the snow introduced in the central main groove 4 so that a large shearing force may be obtained. Subsequently, as the first end portion 21 is released from the contact patch, the compressed snow held by the first projected portion 26 will also be released away from the main groove. This action may be useful to prevent clogging the central main groove 4. It is understood for the person skilled in the art that the same advantageous effects may be brought on the second end portion 22.

Figure 5:
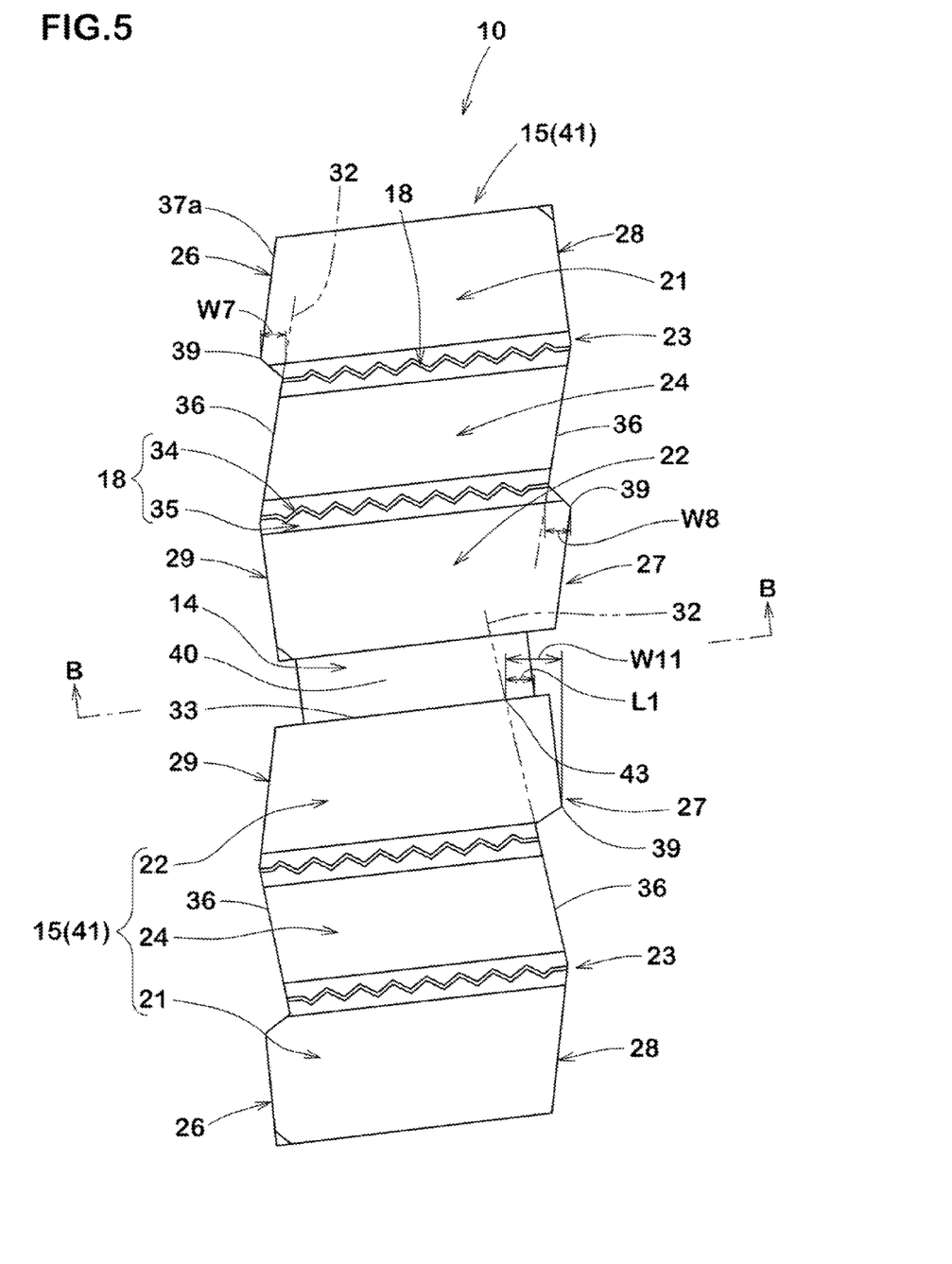
FIG. 5 is an enlarged view of the central portion in accordance with another embodiment of the invention.

FIG. 5 illustrates an enlarged view of the central portion 10 in accordance with another embodiment of the invention. As shown in FIG. 5, the central lateral groove 14 may be provided with a tie-bar 40 in which the bottom is raised. The tie-bar 40 may prevent excessive deformation of the central blocks 15 to improve uneven wear resistance.

Figure 6:
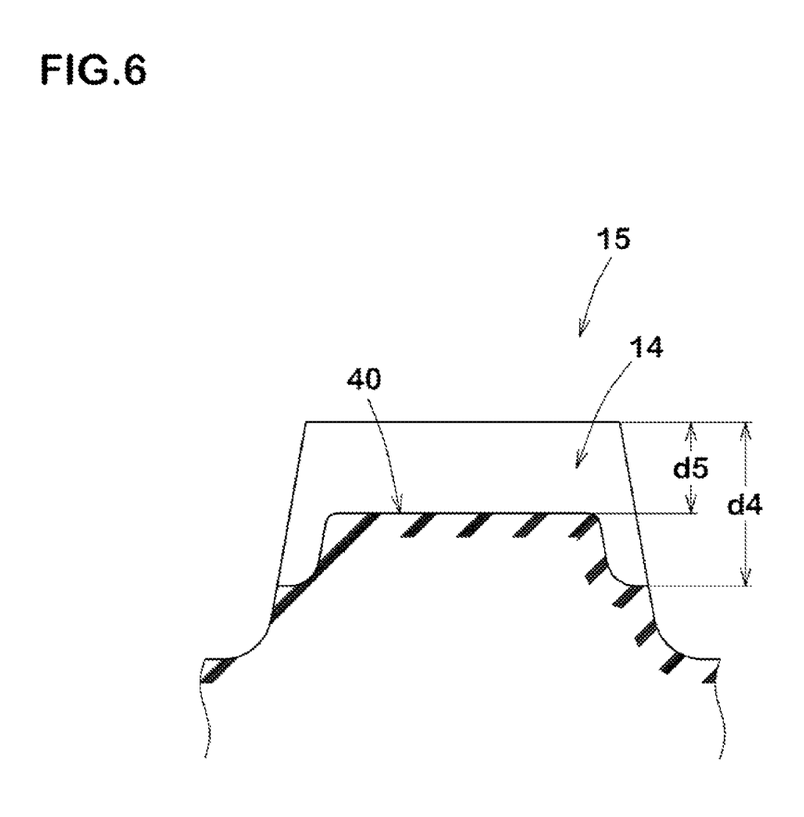
FIG. 6 is a cross-sectional view taken along lines B-B of FIG. 5.

FIG. 6 illustrates a cross-sectional view taken along lines B-B of FIG. 5. As shown in FIG. 6, the central lateral groove 14 has a depth d5 at the tie-bar 40 in a range of from 0.4 to 0.6 times the maximum depth b4 of the central lateral groove 14 in order to improve uneven wear resistance while ensuring on-snow performance as well as wet performance. Referring back to FIG. 5, the tie-bar 40 extends along the central lateral groove 14 so as to cross the extension line 32 of one of the side edges 36 of the middle portion 24. Such a tie-bar 40 may be useful to improve edge effect of the first and second projected portions 26 and 27.

In order to further improve the advantageous effects, an axial protruding length L1 of the tie-bar 40 from the extension line 32 at the edge 33 of the central block 15 is in a range of not less than 0.2 times, more preferably not less than 0.4 times, but preferably not more than 0.8 times, more preferably not more than 0.6 times an axial width W11 from the corner 39 of the first projected portion 27 to an intersection 43 where the extension line 32 crosses the edge 33 of the central block 15.

As shown in FIG. 2, the central portion 10 is preferably formed as a second block row that comprises the first blocks 41 only. This may help to prevent bias traveling of the vehicle.

Preferably, in a pair of central blocks 15 which are circumferentially adjacent, a pair of the first projected portions 26 and 26 may be adjacent through one of the central lateral grooves 14 in order to further improve on-snow traction by compressing the snow strongly between adjacent projected portions. In another aspect of the invention, a pair of the second projected portions 27 and 27 may be adjacent through one of the central lateral grooves 14.

Figure 7:
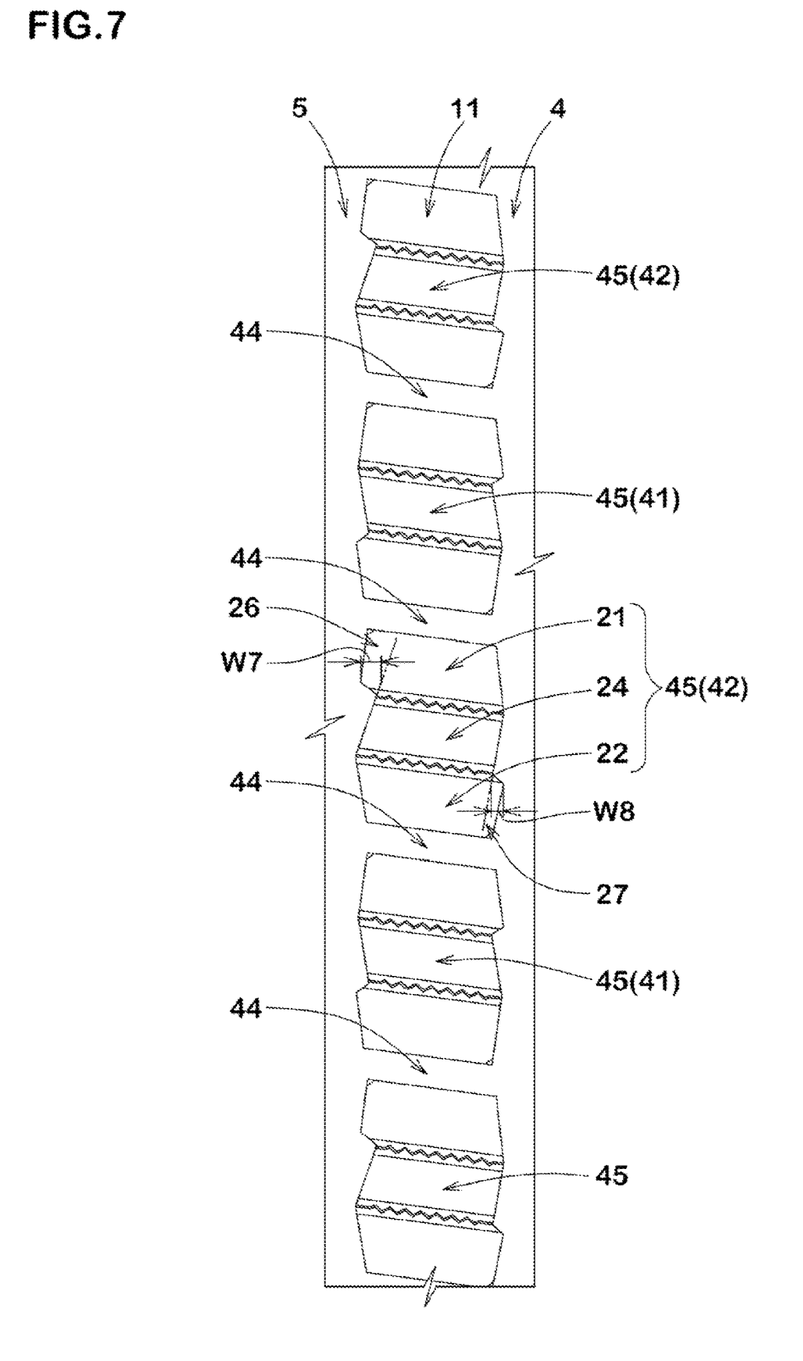
FIG. 7 is an enlarged view of a middle portion illustrated in FIG. 1.

FIG. 7 illustrates an enlarged view of the left side middle portion 11 illustrated in FIG. 1. As shown in FIG. 7, the middle portion 11 is formed between the central main groove 4 and the shoulder main groove 5. The middle portion 11 is provided with a plurality of middle lateral grooves 44 to form a plurality of middle blocks 45.

Each of the middle lateral grooves 44 communicates the central main groove 4 with the shoulder main groove 5. In this embodiment, each of the middle lateral grooves 44 is inclined with respect to the axial direction of the tire in an opposite direction to the central lateral grooves 14 as shown in FIG. 2. Furthermore, each of the middle lateral grooves 44 is arranged in a different location with respect to each of the central lateral grooves 14 in the circumferential direction of the tire.

Each of the middle blocks 45 is formed as the same configuration of the central block 15 (See FIG. 3).

The middle portion 11, for example, is formed as a first block row that include at least one first block 41 that has the first maximum protruding length W7 being substantially same as the second maximum protruding length W8 and at least one second block 42 that has the first maximum protruding length W7 being different from the second maximum protruding length W8. Preferably, the first block 41 and the second block 42 are arranged alternately in the circumferential direction of the tire in the middle portion 11. This configuration may be helpful to prevent clogging up the main groove by the snow.

As shown in FIG. 1, the middle portion 11 formed as the first block row is adjacent to the central portion 10 formed as the second block row. This configuration may further be helpful to prevent clogging up the main groove by the snow by offering the different deformation of the respective blocks during traveling.

Each middle block 45 is arranged so as to be shifted with a substantially half pitch length in relation to each central block 15 in the circumferential direction of the tire, for example. This configuration may further be helpful to prevent clogging up the main groove 4 by the snow while ensuring drainage performance.

As shown in FIG. 7, each of the second blocks 42 has the first maximum protruding length W7 greater than the second maximum protruding length W8. Preferably, the second block 42 is arranged such that the first projected portion 26 protrudes axially outwardly and the second projected portion 27 protrudes axially inwardly. Generally, the shoulder main groove 5 is subjected to receive a ground contacting pressure lower than that of the central main groove 4. In this embodiment, since the first projected portion 26 having the relatively large maximum protruding length is located in the shoulder main groove 5, snow shearing force to be generated from the shoulder main groove 5 may relatively be increased so that the respective snow shearing force generated from the shoulder and central main grooves 4 and 5 are balanced.

Preferably, the second block 42 has the first maximum protruding length W7 in a range of from not less than 1.65 times, more preferably not less than 1.75 times, but preferably not more than 2.00 times, more preferably not more than 1.90 times the second maximum protruding length W8.

Figure 8:
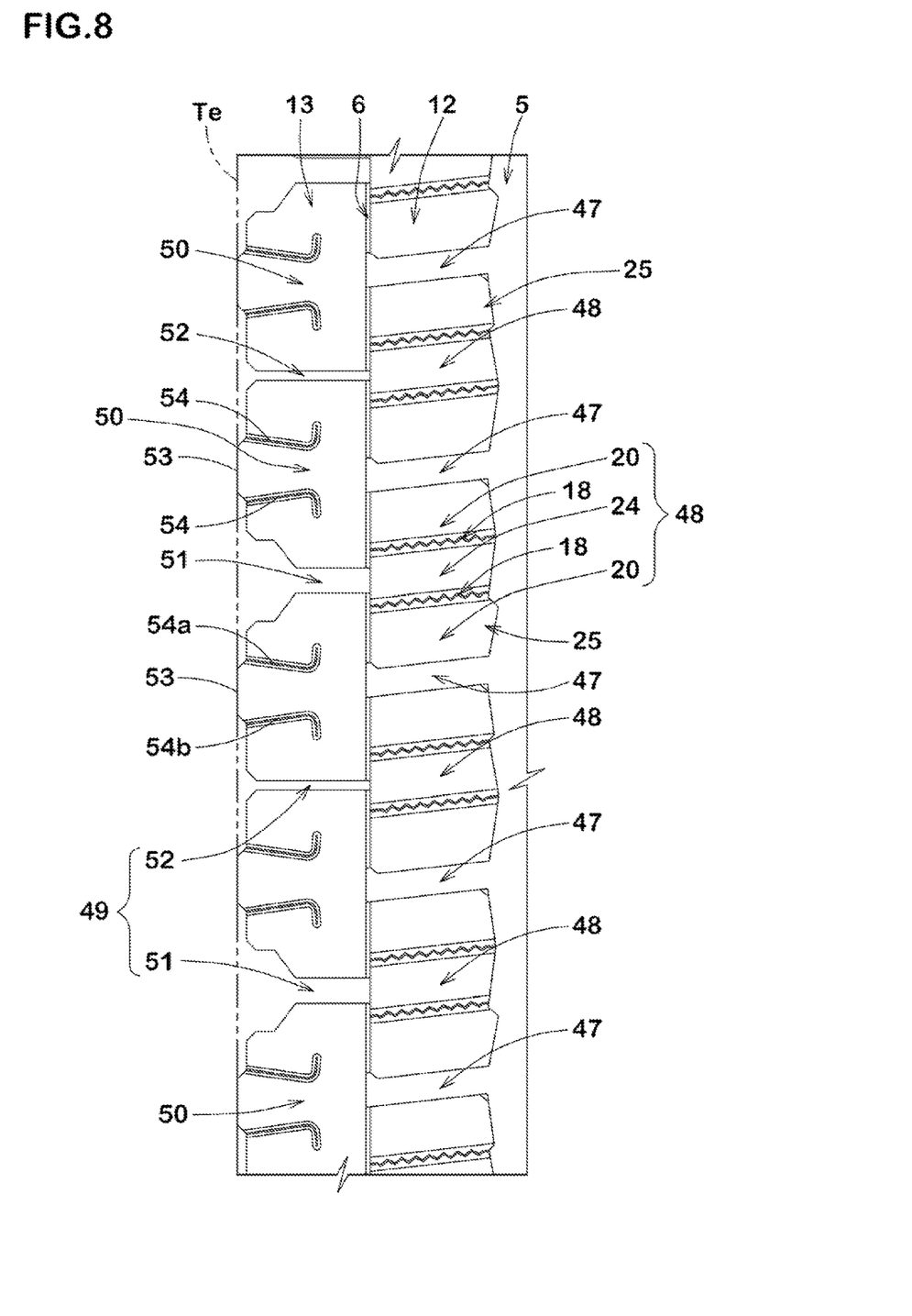
FIG. 8 is an enlarged view of inner and outer shoulder portions illustrated in FIG. 1.

FIG. 8 illustrates an enlarged view of the left side inner and outer shoulder portions 12 and 13 of FIG. 1. As shown in FIG. 8, the inner shoulder portion 12 is formed between the shoulder main groove 5 and the shoulder narrow groove 6. The inner shoulder portion 12 is provided with a plurality of inner shoulder lateral grooves 47 to form a plurality of inner shoulder blocks 48.

Each of the inner shoulder lateral grooves 47 communicates the shoulder main groove 5 with the shoulder narrow groove 6. The inner shoulder lateral groove 47 is inclined in an opposite direction to the middle lateral groove 44 (shown in FIG. 7). Furthermore, each of the inner shoulder lateral grooves 47 is arranged in a different location with respect to each of the middle lateral grooves 44 in the circumferential direction of the tire.

Each of the inner shoulder blocks 48 is provided with only two sipes 18 to divide it into a pair of end portions 20 and a middle portion 24 therebetween.

In the inner shoulder block 48, only one of the end portions 20 is configured as a projected portion 25 that protrudes outwardly in the block-width direction from the middle portion 24 so as to form a steplike side. Such an inner shoulder block 48 may generate a large snow shearing force while ensuring drainage performance of the shoulder main groove 5.

The outer shoulder portion 13 is formed axially outward of the shoulder narrow groove 6, and is provided with a plurality of outer shoulder lateral grooves 49 to form a plurality of outer shoulder blocks 50.

Each of the outer shoulder lateral grooves 49 extends along the axial direction of the tire, and arranged in a different location to each inner shoulder lateral groove 47 in the circumferential direction of the tire. Preferably, the outer shoulder lateral groove 49 has a width which enlarges toward the tread edge Te in order to improve wet performance as well as wandering performance.

In this embodiment, the outer shoulder lateral grooves 49 include a first outer shoulder lateral groove 51 having a width and a second outer shoulder lateral groove 52 having a width smaller than that of the first outer shoulder lateral groove 51, and which are alternately arranged in the circumferential direction of the tire.

The outer shoulder block 50 is provided with at least one sipe 54 that extends axially inwardly from the axially outer side edge 53 of the block without reaching the shoulder narrow groove 6. The sipe 54 may be useful to prevent chipping of the outer shoulder block 50 while improving wandering performance.

Preferably, the sipe 54 may be bent so as to include a longitudinal portion that extends in the circumferential direction of the tire. Furthermore, at least one sipe 54 may include a pair of sipes 54a and 54b each of which has the longitudinal portion that extends toward an opposite direction each another. This configuration may improve wandering performance by relaxing rigidity of the outer shoulder block 50 as well as cracking resistance of the block by preventing a crack to be generated from the axially inner end of the sipe.

While the particularly preferable embodiments of the tire in accordance with the present invention have been described in detail, the present invention is not limited to the illustrated embodiments, but can be modified and carried out in various aspects.

EXAMPLE

Example 1

Figure 9:
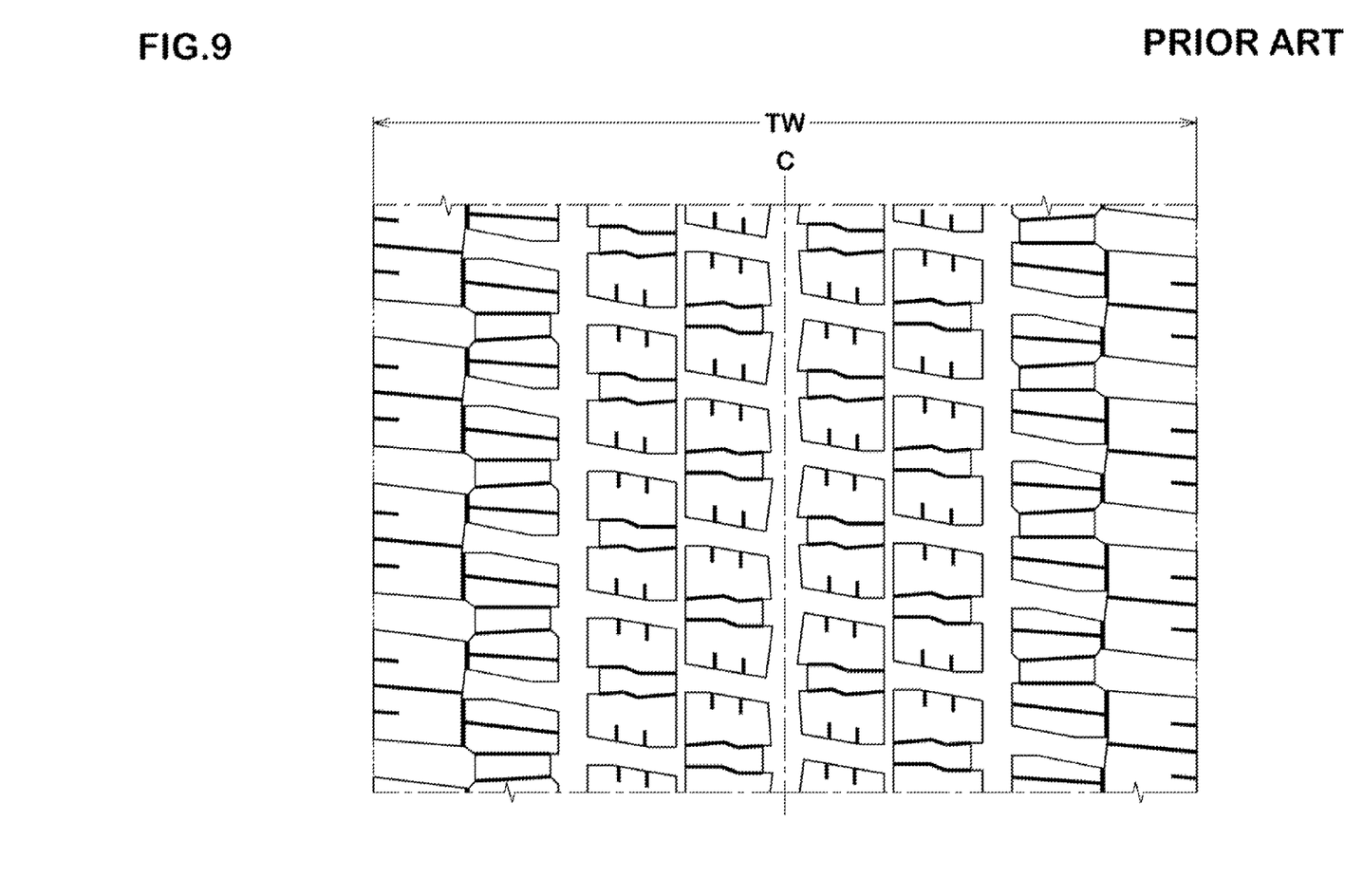
FIG. 9 is a development view of a tread portion of a heavy duty pneumatic tire in accordance with a comparative embodiment.

Heavy duty pneumatic tires having a size of 11R22.5 and the tread pattern shown in FIGS. 1 and 9 were manufactured based on the details of Table 1, and then on-snow performance and wet performance thereof were tested. The common specifications of tires and test procedures are as follows.

Rim size: 8.25×22.5
Internal pressure: 900 kPa
Test vehicle: a 10 ton truck with a 5 ton load on its front side of the platform
Tire installing location: all wheels On-Snow Performance Test:

The above mentioned test vehicle was made to run on snowy road and then the driver evaluated the traveling performance by his feeling. The test results were shown using a score based on Ref. 1 being 100. The larger the value, the better the wet performance is.

Wet Performance Test:

The test driver suddenly started the above mentioned test vehicle using the second gear position by engaging its clutch at the timing of a 1,500 rpm engine speed on a wet asphalt road with a puddle 5 mm deep, and measured the time for traveling to 10 m distance. The test results were evaluated as the time using an index based on Ref. 1 being 100 in Table 1. The smaller the index, the better the wet performance is.

The test results are shown in Table 1. From the test results, it was confirmed that Example tires in accordance with the present invention can be improved on-snow and wet performance in a well balanced manner.

TABLE 1

| (1/2) | | | | | | | | |
|---|---|---|---|---|---|---|---|---|
| | Ref. 1 | Ex. 1 | Ex. 2 | Ex. 3 | Ex. 4 | Ex. 5 | Ex. 6 | Ex. 7 |
| Tread pattern | FIG. 9 | FIG. 1 | FIG. 1 | FIG. 1 | FIG. 1 | FIG. 1 | FIG. 1 | FIG. 1 |
| Ratio W7/W10 | 0.08 | 0.1 | 0.05 | 0.15 | 0.25 | 0.3 | 2 | 2 |
| Ratio W7/W8 | — | 1.83 | 1.83 | 1.83 | 1.83 | 1.83 | 1.65 | 1.75 |
| Projected portion on inner shoulder block | Presence | Presence | Presence | Presence | Presence | Presence | Presence | Presence |
| Sipe on outer shoulder block | Presence | Presence | Presence | Presence | Presence | Presence | Presence | Presence |
| On-snow performance (Score) | 100 | 110 | 106 | 111 | 112 | 112 | 106 | 108 |
| Wet performance (Index) | 100 | 93 | 92 | 94 | 97 | 99 | 92 | 93 |

| | Ex. 8 | Ex. 9 | Ex. 10 | Ex. 11 | Ex. 12 | Ex. 13 | Ex. 14 |
|---|---|---|---|---|---|---|---|
| Tread pattern | FIG. 1 | FIG. 1 | FIG. 1 | FIG. 1 | FIG. 1 | FIG. 1 | FIG. 1 |
| Ratio W7/W10 | 2 | 2 | 0.1 | 0.1 | 0.1 | 0.15 | 0.25 |
| Ratio W7/W8 | 1.9 | 2 | 1.83 | 1.83 | 1.83 | 1.83 | 1.83 |
| Projected portion on inner shoulder block | Presence | Presence | None | Presence | None | None | None |
| Sipe on outer shoulder block | Presence | Presence | Presence | None | None | None | None |
| On-snow performance (Score) | 110 | 110 | 107 | 109 | 107 | 108 | 109 |
| Wet performance (Index) | 94 | 95 | 93 | 95 | 94 | 95 | 98 |

Example 2

Heavy duty pneumatic tires having a size of 11R22.5 and the tread pattern shown in FIGS. 1 and 9 were manufactured based on the details of Table 2, and then on-snow performance, wet performance and wear resistance thereof were tested. The common specifications of tires and the test procedures of on-snow and wet performance are the same as the mentioned above. The wear resistance test is as follows.

Wear Resistance Test:

The test vehicle was made to run on a dry asphalt test course for a certain distance and then the amount of average wear of the central blocks was measured. The results were indicated using an index beaded on Ref. 1 being 100. The smaller the value, the better the performance is.

The test results are shown in Table 2. From the test results, it was confirmed that Example tires in accordance with the present invention can be improved on-snow and wet performance in a well balanced manner.

TABLE 2

| | Ref. 1 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Tread pattern | FIG. 9 | FIG. 1 | FIG. 1 | FIG. 1 | FIG. 1 | FIG. 1 | FIG. 1 | FIG. 1 | FIG. 1 | FIG. 1 | FIG. 1 |
| Ratio W7/W10 | 0.08 | 0.15 | 0.05 | 0.1 | 0.2 | 0.25 | 0.15 | 0.15 | 0.15 | 0.15 | 0.15 |
| Tie-bar on central lateral grooves | None | Presence | Presence | Presence | Presence | Presence | Presence | Presence | Presence | Presence | None |
| Ratio L1/W11 | — | 0.5 | 0.5 | 0.5 | 0.5 | 0.5 | 0.2 | 0.4 | 0.6 | 0.8 | — |
| On-snow performance (Score) | 100 | 88 | 92 | 90 | 88 | 87 | 87 | 88 | 88 | 90 | 87 |
| Wet performance (Index) | 100 | 97 | 95 | 97 | 97 | 96 | 96 | 97 | 98 | 98 | 96 |
| Wear resistance (Index) | 100 | 98 | 100 | 99 | 100 | 103 | 103 | 100 | 98 | 96 | 103 |

What is claimed is:

1. A heavy duty pneumatic tire comprising:
   a tread portion comprising a plurality of blocks separated by a plurality of circumferentially extending main grooves and a plurality of lateral grooves;
   at least one of the blocks being provided with two axially extending sipes to divide the block into a first end portion, a second end portion and a middle portion between the first end portion and the second end portion;
   the first end portion comprising a first projected portion that protrudes outwardly in a block-width direction from the middle portion so as to form a steplike side;
   the second end portion comprising a second projected portion that protrudes outwardly in an opposite block-width direction to the first projected portion from the middle portion so as to form a steplike side; and
   in a plan view of the tread portion, the middle portion having a pair of side edges each facing the respective main grooves, the pair of side edges each inclined in the same direction as each other with respect to the tire circumferential direction,
   wherein each of the first projected portion and the second projected portion has an edge inclined in the same direction as the side edges of the middle portion with respect to the tire circumferential direction,
   wherein the first projected portion has a first maximum protruding length from an extension line of a corresponding side edge of the middle portion,
   wherein the second projected portion has a second maximum protruding length from an extension line of a corresponding side edge of the middle portion, and
   wherein the blocks comprise a first block and a second block, the first block having the first maximum protruding length substantially same as the second maximum protruding length, and the second block having the first maximum protruding length different from the second maximum protruding length.

2. The heavy duty pneumatic tire according to claim 1, wherein
   the first maximum protruding length of the middle portion is in a range of from 0.10 to 0.25 times a block width, and
   the second maximum protruding length of the middle portion is in a range of from 0.10 to 0.25 times the block width.

3. The heavy duty pneumatic tire according to claim 1, wherein the tread portion further comprises a first block row comprising the first block and the second block which are alternately arranged in a circumferential direction of the tire.

4. The heavy duty pneumatic tire according to claim 3, wherein the tread portion further comprises a second block row comprising only a plurality of the first blocks, and the first block row and the second block row are arranged axially adjacently.

5. The heavy duty pneumatic tire according to claim 1, wherein the first end portion further comprises a first non-projected portion on an axially opposite side of the first projected portion, and the first non-projected portion does not protrude outwardly from the middle portion in the block-width direction.

6. The heavy duty pneumatic tire according to claim 5, wherein the first non-projected portion is inclined in an opposite direction to the side edges of the middle portion.

7. The heavy duty pneumatic tire according to claim 1, wherein the second end portion further comprises a second non-projected portion on an axially opposite side of the second projected portion, and the second non-projected portion does not protrude from the middle portion in the block-width direction.

8. The heavy duty pneumatic tire according to claim 7, wherein the second non-projected portion is inclined in an opposite direction to the side edges of the middle portion.

9. The heavy duty pneumatic tire according to claim 1, wherein
   at least one of the lateral grooves arranged adjacent to the first end portion is provided with a tie-bar in which a bottom is raised, and
   the tie-bar extends along the lateral groove so as to cross an extension line of the side edges of the middle portion corresponding to the first projected portion.

10. The heavy duty pneumatic tire according to claim 9, wherein
    the first end portion has a straight extending lateral edge facing one of the lateral grooves,
    the first projected portion protrudes outwardly in the block-width direction from the extension line, and
    an axial protruding length of the tie-bar from the extension line is in a range of from 0.2 to 0.8 times an axial protruding length of the first end portion from the extension line.

11. The heavy duty pneumatic tire according to claim 1, wherein angles of the side edges of the middle portion with respect to the circumferential direction of the tire are greater than each angle of each edge of the first projected portion and the second projected portion with respect to the circumferential direction of the tire.

* * * * *